June 21, 1960 S. B. COHN 2,942,209

LUMPED CONSTANT DIRECTIONAL FILTERS

Filed Feb. 26, 1957

INVENTOR,
SEYMOUR B. COHN.

BY Harry M. Saragovitz

ATTORNEY.

United States Patent Office 2,942,209

Patented June 21, 1960

2,942,209

LUMPED CONSTANT DIRECTIONAL FILTERS

Seymour B. Cohn, Palo Alto, Calif., assignor to the United States of America as represented by the Secretary of the Army Filed Feb. 26, 1957, Ser. No. 642,627

7 Claims. (Cl. 333—10)

The invention relates to lumped constant directional filters for multiplexing circuits. More particularly, it relates to components that have the properties of selecting a signal of a particular frequency or band of frequencies from a signal having other frequencies and of directing the selected signal in a predetermined direction along a given circuit. These same components possess also the properties of passing a signal having a predetermined frequency from one circuit to another circuit and of directing it in one direction along said other circuit with signals of other frequencies. The properties just mentioned are useful in multiplexing systems and in these systems there will be a plurality of such components, each designed to select a signal of a different frequency or frequency band. For any one system there will be as many components as there are signals to be selected or combined in the system.

A system of this character finds its greatest utility in communication systems wherein it is desired to transmit a plurality of signals over a given circuit or from a single antenna. At the transmitting station the multiplexing system would function to combine the various signals of different frequencies for transmission, and at the receiving station the multiplexing system would receive the combined signals and separate them according to their frequency. The separated signals are then directed into a predetermined circuit towards their ultimate point of use.

The filter components, according to the present invention, have the following properties: they are provided with four arms, each arm composed of a terminal pair; one arm has the response of a band pass filter; another arm has the response of a band-rejection filter; another arm has a zero response; and the final arm is the input arm. The arrangement is such that any arm may be used as the input arm. The input arm is non-reflecting when the other arms are connected to their characteristic impedances.

Circuits for transmission and separation of signals in multiplexing systems admit the use of lumped constant elements for accomplishing the desired results. The invention, as described herein, pertains particularly to the use of lumped constant elements arranged in relation to each other in a particular manner to provide the desired properties.

An object of the invention is to provide a directional filter component for multiplexing systems utilizing lumped constant elements.

Another object of the invention is to provide a directional filter for a transmission line utilizing lumped constant elements.

Still another object of the invention is to provide an improved directional filter component suitable for use in a multiplexing means for a transmission system utilizing lumped constant elements.

Figure 1:
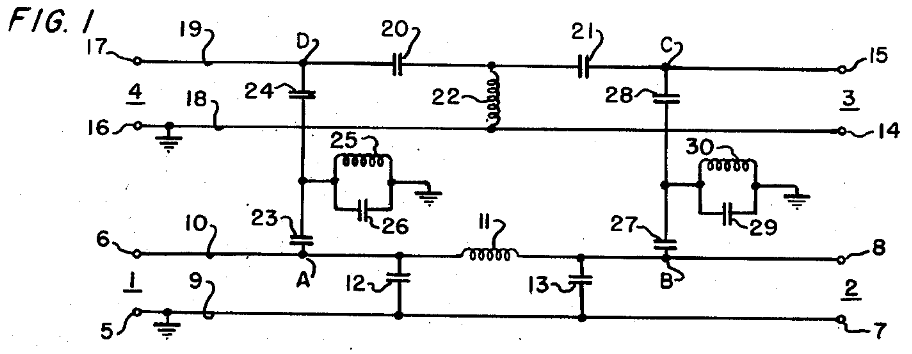
Figure 2:
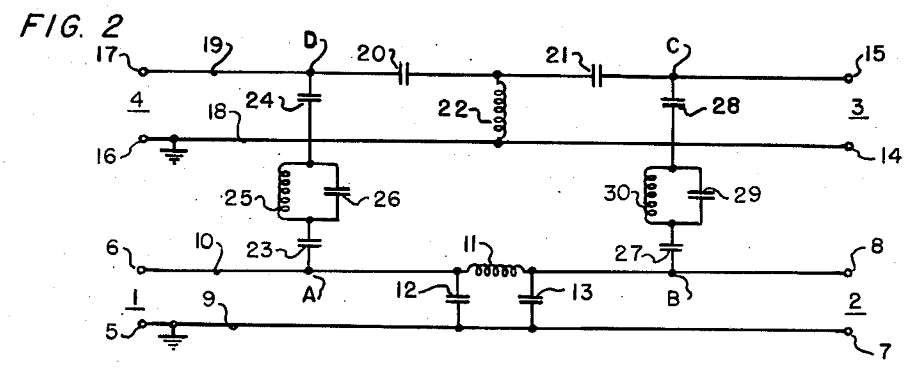
Figure 3:
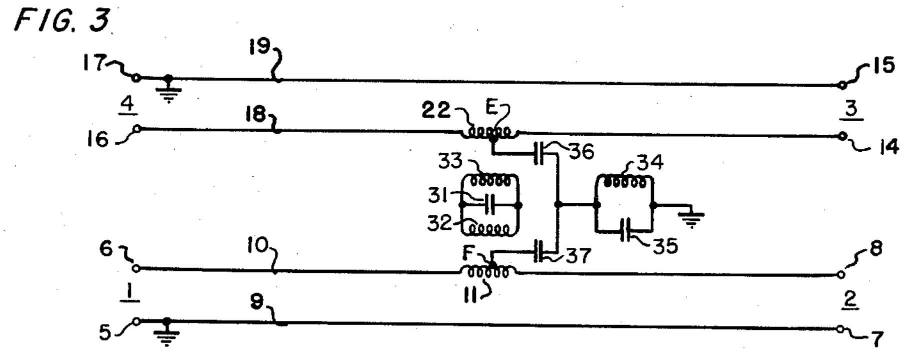
Figure 4:
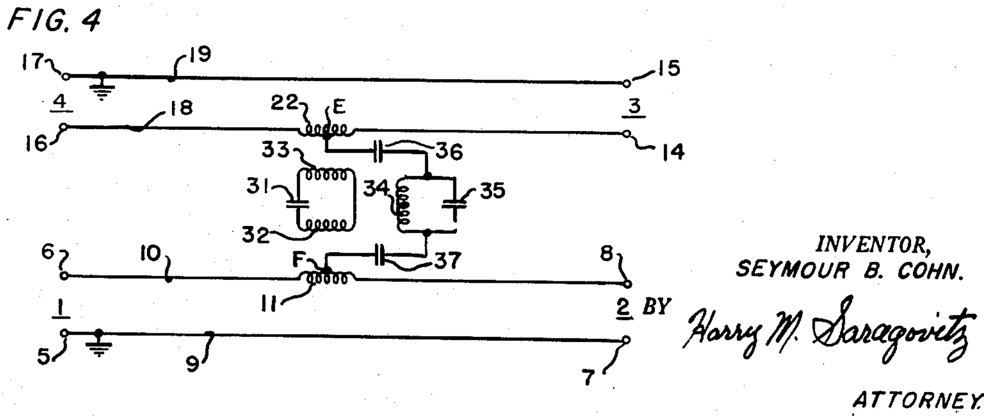

Other objects of the invention will become apparent upon consideration of the following description and the disclosure of the drawings in which:

Fig. 1 is a diagrammatic view illustrating one embodiment of the invention; Fig. 2 is a diagrammatic view illustrating a modification of the embodiment shown in Fig. 1; Fig. 3 is a diagrammatic view illustrating a second embodiment of the invention; and, Fig. 4 is a diagrammatic view illustrating a modification of the embodiment shown in Fig. 3.

In multiplexing systems wherein separate signals are combined and are transmitted in different frequency bands over a single circuit or means, the distinguishing feature of the separate signals is their frequency or range of frequencies in the spectrum. To extract the separate signals from a common circuit involves providing a circuit which has a low loss path to the signal to be extracted over which the selected signal will move and a circuit which has a low loss path to all other signals over which they may move. Through the use of lumped constant elements arranged different ways, circuits may be provided which are tuned to pass a particular frequency band and to offer a high loss to all other frequency bands. Other circuits may be provided which are tuned to pass all frequencies except the particular band of frequencies. In this invention, lumped constant elements are arranged as to provide circuits having band-pass characteristics for the selection of signals of the particular frequency band.

The directional characteristics of the filter component are essential, especially in transmission lines which are not terminated in the filter. There is one direction along a given transmission line in which it is desired that the selected signal be transmitted. These directional characteristics are obtained in one embodiment of the present invention by providing two resonant circuits for coupling the transmission lines at points separated by lumped constant elements which effect a phase shift. The wave energy of the particular frequency band when combined produce the directivity desired.

Figs. 1 and 2 illustrate one embodiment of the invention. In each are a pair of transmission lines, each comprised of a pair of conductors with lumped constant elements arranged therein. One line comprises the terminals 5 and 6 constituting arm 1 connected respectively by conductors 9 and 10 to the terminals 7 and 8, constituting arm 2. The other line comprises terminals 14 and 15 constituting arm 3 connected by conductors 18 and 19 respectively to the terminals 16 and 17 constituting arm 4. Conductors 9 and 18 are connected to ground. The conductor 10 has a series connected inductor 11 therein with the inductor shunted at opposite ends thereof by capacitors 12 and 13 to the grounded conductor 9. The conductor 19 has a pair of series connected capacitors 20 and 21 therein with a point between said capacitors 20 and 21 shunted by inductor 22.

The network comprising the inductor 11 and the capacitors 12 and 13 is a phase shifting network for producing a lag of one-quarter wave length or 90 degrees there-across at the particular frequency band desired. In other words an energy wave propagated along the line 9, 10, if it is within the particular frequency limits, will undergo a phase shift of 90 degrees in the network. The phase shift will be in a lagging direction regardless of the direction in which the wave is propagated through the network.

The network comprising the capacitors 20 and 21 and the inductor 22 is also a phase shifting network for producing a lead of one-quarter wave length or 90 degrees there-across at the same particular frequency band desired. In other words an energy wave of the proper frequency, propagated along the line 18, 19 will undergo a change of phase of 90 degrees in the network. The phase shift will be in a leading direction.

The two transmission lines are coupled together on opposite sides of the phase shift networks between points A and D and between points B and C by resonant circuits. In Fig. 1 the resonant circuits are arranged to provide a low loss path to the particular band of frequencies so that the particular band of frequencies will be coupled between the two transmission lines at the two sides of the phase shift networks. In Fig. 2 the resonant circuits providing the coupling between similar points A and D and points B and C are also arranged to provide a low loss path to the particular band of frequencies and a high loss path to all other bands of frequencies.

In Fig. 1, between the points A and D is connected a circuit having a pair of series connected capacitors 23 and 24. The circuit between the capacitors 23 and 24 is connected to ground through a parallel resonant circuit comprised of inductor 25 and capacitor 26 connected in parallel. Between the points B and C is connected a circuit having a pair of series connected capacitors 27 and 28. Between the capacitors 27 and 28 the circuit is connected to ground through a parallel circuit comprising the inductor 30 and the capacitor 29. The parallel resonant circuit with the series connected capacitors provide at the resonant frequency a low loss path, in turn providing for coupling of maximum energy from one transmission line to the other at resonant frequencies.

In Fig. 2 the coupling is made between the same points on opposite sides of the phase shift networks as in Fig. 1, i.e., the one transmission line is connected from points A and B to points D and C on the other transmission line. In Fig. 2 the coupling circuits comprise a resonant circuit resonant to the particular frequency connected by coupling capacitors. Between the points A and D the circuit includes coupling capacitors 23 and 24 between which is connected the resonant circuit comprising the parallel connected inductor 25 and the capacitor 26. Between the points B and C the circuit includes coupling capacitors 27 and 28 between which is connected the resonant circuit comprising the parallel connected inductor 30 and capacitor 29. In this arrangement, the resonant circuit is in series with coupling capacitors between the two transmission lines This arrangement also offers a low loss path for energy at resonant frequencies and a high loss path for energy at other frequencies.

For simplicity, the explanations of operation to follow are approximate and qualitative. For a more exact method of analysis reference is made to Proc. I.R.E., vol. 44, pp. 1018–1024, August 1956 (co-authored by F. S. Coale). That method, which utilizes even and odd modes of excitation may be applied readily to the filter networks herein disclosed. The embodiment of Fig. 1 operates for example to pass wave energy from the arm 1 toward the arm 2, the wave energy being in separate bands of the frequency spectrum. Energy in the particular band of frequencies at which the resonant circuits are tuned will be conducted to the transmission line 18, 19 between the points A and D and between the points B and C. The wave energy from the arm 1 taking the path through the network 11–13 will undergo a 90 degree phase shift in a lagging direction (−90 degrees) and will arrive at the point C with a phase difference of 90 degrees from that arriving at the point D. From the points C and D the wave energy is propagated in two directions along the transmission line 18, 19, i.e., toward the arm 4 on the one hand and toward the arm 3 on the other hand.

The wave energy from the point C toward the arm 4, which is lagging by 90 degrees, undergoes a further phase shift of 90 degrees in a leading direction in passing through the phase shift network 20–22, to arrive at the point D in time phase with the wave energy from that point toward the arm 4. This is the correct phase relation for the one wave to re-enforce the other and the output of the arm 4 will then be that which is equivalent to a band-pass filter. In other words the selected band of frequencies for which the resonant circuits are designed will appear at the arm 4.

The wave energy from the point D toward the arm 3 in traversing the phase shift network 20–22 will undergo a phase shift of 90 degrees in a leading direction (plus 90 degrees) and will arrive at the point C with a phase difference of one hundred and eighty degrees (180 degrees) with that wave energy propagated from the point C toward the arm 3. This is the correct phase relation for the one wave to cancel the other wave. An exact analysis shows that arm 3 has zero output. The low impedance paths between the two transmission lines will extract the wave energy of the selected band of frequencies and the wave energy of the input arm 1 minus the wave energy extracted will appear at the arm 2, and the arm 2 will have the response of a band-rejection filter.

In the modification shown in Fig. 2 the frequency response behavior is the same as that shown in Fig. 1. A band pass response occurs between arms 1 and 4 and a band rejection response between arms 1 and 2. The center frequency occurs where elements 25 and 26 in parallel have a reactance equal to the negative of that of elements 23 and 24 in parallel. In other words, where the reactance between A and D is zero.

In Figs. 3 and 4 the directional characteristics are obtained in a different manner from that of the previously disclosed embodiment. In the embodiment of Figs. 3 and 4 the coupling is made at single points E and F in each transmission line. Two energy waves are coupled at the points which have characteristics, which when combined, provide a wave propagated along the transmission line in one direction only.

Figs. 3 and 4 each illustrate a pair of transmission lines comprised of a pair of conductors with lumped constant elements arranged therein. One transmission line comprises the terminals 5 and 6 constituting arm 1, connected by conductors 9 and 10 to terminals 7 and 8, constituting arm 2. The other transmission line comprises terminals 14 and 15 constituting arm 3 connected by conductors 18 and 19 to terminals 16 and 17, constituting arm 4. In the conductors 10 and 18 is respectively connected a winding 11 and 22 of a pair of coupling transformers, the other windings respectively being windings 32 and 33. The conductors 9 and 19 are connected to ground. To this extent the embodiment of Fig. 3 and the modification of Fig. 4 are similar.

In the embodiment of Fig. 3 the terminals of the windings 32 and 33 of the transformers are connected together, across which is connected a capacitor 31. The windings 11 and 22 of the transformers have center-taps, and a circuit having series connected capacitors 36 and 37 connect the center-taps. The circuit is connected to ground from a point between the capacitors 36 and 37, by a resonant circuit having a parallel connected inductor 34 and a capacitor 35. The resonant circuit provides for a coupling of energy between points F and E within a narrow band of frequencies near the resonant frequency of elements 34 and 35. The parallel arrangement of the capacitor 31 and the windings 32 and 33 also provides a resonant circuit which couples wave energy having the same band of frequencies as the resonant circuit 34, 35 provides for.

In the modification of Fig. 4 the windings 32 and 33 are connected in series, one terminal of one winding being directly connected to one terminal of the other winding and the other terminal of the one winding being connected through a capacitor 31 to the other terminal of the other winding. The points E and F, or the center-taps of the windings 22 and 11 are connected together through coupling capacitors 36 and 37 and a parallel resonant circuit comprising the inductor 34 and the capacitor 35. This modification has the same frequency response behavior as the modification of Fig. 3. That is, a band pass response occurs from lines 9 and 10 to lines 18 and 19, while a band rejection response occurs between arms 1 and 2. As in Figs. 1 and 2, the center frequency is near but not exactly at the resonant frequency of the elements 34 and 35.

The embodiment of Fig. 3 operates to pass energy of a given narrow band of frequencies between the two transmission lines. The transfer of this energy is by two paths, one by way of the coupling capacitors 36 and 37 and the other by way of the coupling transformers. If it is assumed that energy having frequencies in bands distributed and separated from each other in the frequency spectrum is fed to the arm 1, a certain band of frequencies will be transmitted across the couplings to the other transmission line 18, 19. The voltage wave transmitted by way of capacitors 37 and 36 to the point E will spread from that point in the two directions along the transmission line and will cause currents to flow either toward the point E or from the point E. For the purpose of explanation it is assumed that the current induced will be from the point E toward the arms 4 and 3. Simultaneously a voltage wave will be induced in the transmission line by reason of transformer action and the voltage wave will be in effect series induced. That is, the voltage difference will be between the terminals of the winding 22 and a current induced by reason of this voltage will flow toward the point E, say from the arm 3 and from the point E toward the arm 4. Now it appears that the currents induced flowing in the direction of the arm 4 from the point E, if in phase will re-enforce each other, while the currents on the other side of the point E will be in opposite directions or opposite phase and will add up to cancel each other. This of course assumes that the currents or energy waves are of the same magnitudes. It is thus seen that the selected band of frequencies will appear at the arm 4, and that there will be no output from the arm 3. It is also seen from this arrangement that the energy, in other than the selected band of frequencies, will appear at the arm 2, since the coupling between the transmission line will not pass these frequencies.

The operation of the modification shown in Fig. 4 is similar in all respects to that of Fig. 3.

Having described the invention and the best mode contemplated for making and using the same, what is considered as my invention is set forth in the following claims.

I claim:

1. A directional filter circuit for a multiplexing system comprising a pair of transmission lines, each transmission line comprising a pair of conductors; means for coupling wave energy from one of said pair of transmission lines to the other of said pair of transmission lines, said means comprising a pair of coupling circuits connecting said transmission lines at spaced points therealong each coupling of which include frequency selective means selective to the same particular frequencies; and means in each said transmission lines between said spaced points for effecting a phase shift of the transmitted energy in said transmission lines for combining the outputs from said pair of coupling circuits in the coupled one of said pair of transmission lines to direct the wave energy in one direction along said coupled one of said transmission lines.

2. A directional filter for a multiplexing system comprising a pair of transmission lines; a phase shift network in one of said pair of transmission lines for providing a phase shift of ninety degrees in a lagging direction in a signal of a particular frequency band; a phase shift network in the other of said transmission lines for providing a phase shift of ninety degrees in a leading direction in the same signal; and means for coupling the transmission lines on each side of the phase shift networks, said means being frequency selective to the same particular band of frequencies.

3. A directional filter for a multiplexing system comprising a pair of transmission lines, each comprising a grounded and an ungrounded conductor; a phase shift network operable at a particular frequency in one transmission line comprising an inductor connected in series with the ungrounded conductor and a pair of capacitors connecting the ungrounded conductor at opposite ends of said inductor to the grounded conductor in said one transmission line; a phase shift network operable at the same particular frequency in the other transmission line comprising a pair of capacitors connected in series with the ungrounded conductor and an inductor connecting said ungrounded conductor from a point between said capacitors to the grounded conductor of said other transmission line; coupling means connecting said transmission lines on one side of the phase shift networks, said coupling means comprising a circuit offering low loss to the particular band of frequencies and high loss to other bands of frequencies; and coupling means connecting said transmission lines on the other side of said phase shift networks, said coupling means comprising a circuit offering low loss to the same particular band of frequencies and a high loss to other bands of frequencies.

4. A directional filter for a multiplexing system comprising a pair of transmission lines each comprising a grounded and an ungrounded conductor; a phase shift network operable at a particular frequency in one transmission line comprising an inductor connected in series with the ungrounded conductor and a pair of capacitors connecting the ungrounded conductor at opposite ends of said inductor to the grounded conductor in said one transmission line; a phase shift network operable at the same particular frequency in the other transmission line comprising a pair of capacitors connected in series with the ungrounded conductor and an inductor connecting said ungrounded conductor from a point between said capacitors to the grounded conductor of said other transmission line; means connecting said transmission lines on corresponding sides of said phase shift networks comprising a first circuit having a pair of series connected capacitors therein connecting the ungrounded conductors of said transmission lines, and a second circuit connecting said first circuit from a point between the capacitors therein to the grounded conductors, said second circuit comprising a parallel resonant inductor and capacitor; and means connecting said transmission lines on the other corresponding sides of said phase shift networks comprising a third circuit having a pair of series connected capacitors therein connecting the ungrounded conductors of said transmission lines, and a fourth circuit connecting said third circuit from a point between the capacitors therein to the grounded conductors, said fourth circuit comprising a parallel inductor and capacitor, said parallel inductors and capacitors having values to provide like impedances to ground at the same particular frequencies.

5. A directional filter for a multiplexing system comprising a pair of transmission lines each comprising a grounded and an ungrounded conductor; a phase shift network in one transmission line comprising an inductor connected in series with the ungrounded conductor and a pair of capacitors connecting the ungrounded conductor at opposite ends of said inductor to the grounded conductor in said one transmission line; a phase shift network in the other transmission line comprising a pair of capacitors connnected in series with the ungrounded conductor and an inductor connecting said ungrounded conductor from a point between said capacitors to the grounded conductor of said transmission line; means connecting said transmission lines on corresponding sides of said phase shift networks comprising a circuit having a parallel connected inductor and capacitor connected in series with a capacitor at each end to the ungrounded conductors of said transmission line; and means connecting said transmission lines on the other side of said phase shift networks comprising a circuit having a parallel connected inductor and capacitor connected in series with a capacitor at each end to the ungrounded of said transmission lines, said last two named means being tuned to the same resonant frequency.

6. A directional filter for a multiplexing system comprising a pair of transmission lines, each comprising a grounded and an ungrounded conductor; a transformer having a center-tapped winding connected in series with the ungrounded conductor of one transmission line and a second winding inductively coupled therewith; a transformer having a center-tapped winding connnected in series with the ungrounded conductor of the other transmission line and a second winding inductively coupled therewith; means connecting the terminals of the second windings of the two transformers across a common capacitor; a circuit comprising a pair of capacitors in series connecting center taps of the tapped windings of said transformers; and means comprising an inductor and capacitor in parallel connecting said circuit between said capacitors to the ground conductors of said transmission lines, said last two named means being tuned to the same frequency whereby each means couples the same band of frequencies between the transmission lines.

7. A directional filter for a multiplexing system comprising a pair of transmission lines each comprising a grounded and ungrounded conductor; a transformer having a center-tapped winding connected in series with the ungrounded conductor of one transmission line and a second winding inductively coupled therewith; a transformer having a center-tapped winding connected in series with the ungrounded conductor of the other transmission line and a second winding inductively coupled therewith; means including a capacitor connecting the second winding of said transformers in series; and a circuit connecting the center-taps of said transformer windings, said circuit comprising a parallel connected inductor and capacitor connected at each end through coupling capacitors to said center-taps, said transformer coupling means and said parallel connected inductor and capacitor providing parallel coupling means tuned to pass a selected band of frequencies.

References Cited in the file of this patent

UNITED STATES PATENTS

| | | |
|---|---|---|
| 2,617,881 | Lewis et al. | Nov. 11, 1952 |
| 2,756,282 | Douma | July 24, 1956 |
| 2,854,636 | Marie | Sept. 30, 1958 |

FOREIGN PATENTS

| | | |
|---|---|---|
| 1,130,270 | France | Sept. 24, 1956 |

OTHER REFERENCES

Mumford: "Directional Couplers," Proceedings of the I.R.E., vol. 35, No. 2, February 1947, pages 160–165.

S. B. Cohn and F. S. Coale: Proceedings of the I.R.E., August 1956, vol. 44, No. 8.